(12) United States Patent
Gerding et al.

(10) Patent No.: US 10,088,351 B2
(45) Date of Patent: Oct. 2, 2018

(54) MEASURING DEVICE AND MEASURING ARRANGEMENT

(71) Applicant: KROHNE Messtechnik GmbH, Duisburg (DE)

(72) Inventors: Michael Gerding, Bochum (DE); Björn Schäfer, Bochum (DE)

(73) Assignee: KROHNE Messtechnik GmbH, Duisburg (DE)

( * ) Notice: Subject to any disclaimer, the term of this patent is extended or adjusted under 35 U.S.C. 154(b) by 92 days.

(21) Appl. No.: 15/260,496

(22) Filed: Sep. 9, 2016

(65) Prior Publication Data

US 2017/0074708 A1    Mar. 16, 2017

(30) Foreign Application Priority Data

Sep. 16, 2015 (DE) .................. 10 2015 115 614

(51) Int. Cl.

| G01F 23/00 | (2006.01) |
| G01D 3/02 | (2006.01) |
| G01D 3/08 | (2006.01) |
| G01D 18/00 | (2006.01) |
| G01D 21/00 | (2006.01) |

(52) U.S. Cl.
CPC ......... G01F 23/0061 (2013.01); G01D 3/022 (2013.01); G01D 3/08 (2013.01); G01D 18/008 (2013.01); G01D 21/00 (2013.01)

(58) Field of Classification Search
CPC ...... G01D 18/008; G01D 21/00; G01D 3/022; G01D 3/08; G01F 23/0061

USPC ...... 702/50, 55, 85, 100, 185, 22; 73/290 R, 73/862.626; 700/281
See application file for complete search history.

(56) References Cited

U.S. PATENT DOCUMENTS

| 8,037,753 B2 | 10/2011 | Fehrenbach et al. |
| 8,209,039 B2 | 6/2012 | Davis et al. |
| 8,805,638 B2 | 8/2014 | Morath |
| 9,702,742 B2 | 7/2017 | Reimann |
| 2004/0183550 A1 | 9/2004 | Fehrenbach et al. |
| 2011/0320158 A1 | 12/2011 | Steckenreiter et al. |
| 2012/0074972 A1 | 3/2012 | Rasbornig et al. |

(Continued)

FOREIGN PATENT DOCUMENTS

| DE | 101 58 745 A1 | 6/2003 |
| DE | 10 2004 008 125 A1 | 9/2005 |

(Continued)

*Primary Examiner* — John H Le
(74) *Attorney, Agent, or Firm* — David S. Safran

(57) ABSTRACT

A measuring arrangement and a measuring device having a sensor device, a processing device, a storage device, an interface and a control device that allows for a simplified testing of the functionality of the measuring device is achieved in that the control device retrieves externally provided data via the interface and performs a test of the measuring device. The test thereby involves the control device determining a reference value from the externally provided data, comparing the reference value to a measured value generated by the processing device and generating a comparison result based thereupon. Alternatively, the test involves the control device using the externally provided data for the generation of new calculation data to be stored in the storage device and storing the new calculation data in the storage device.

6 Claims, 1 Drawing Sheet

(56) References Cited

U.S. PATENT DOCUMENTS

| | | | |
|---|---|---|---|
| 2012/0310545 A1* | 12/2012 | Drahm | G01F 1/8431 |
| | | | 702/22 |
| 2014/0260691 A1* | 9/2014 | Hammerschmidt | G01L 1/142 |
| | | | 73/862.626 |
| 2016/0084877 A1 | 3/2016 | Neuburger | |
| 2016/0190749 A1 | 6/2016 | Wernet et al. | |
| 2017/0059390 A1 | 3/2017 | Brenzinger et al. | |

FOREIGN PATENT DOCUMENTS

| | | |
|---|---|---|
| DE | 20 2006 010 007 U1 | 9/2006 |
| DE | 10 2006 016 381 A1 | 10/2007 |
| DE | 10 2006 036 646 A1 | 2/2008 |

* cited by examiner

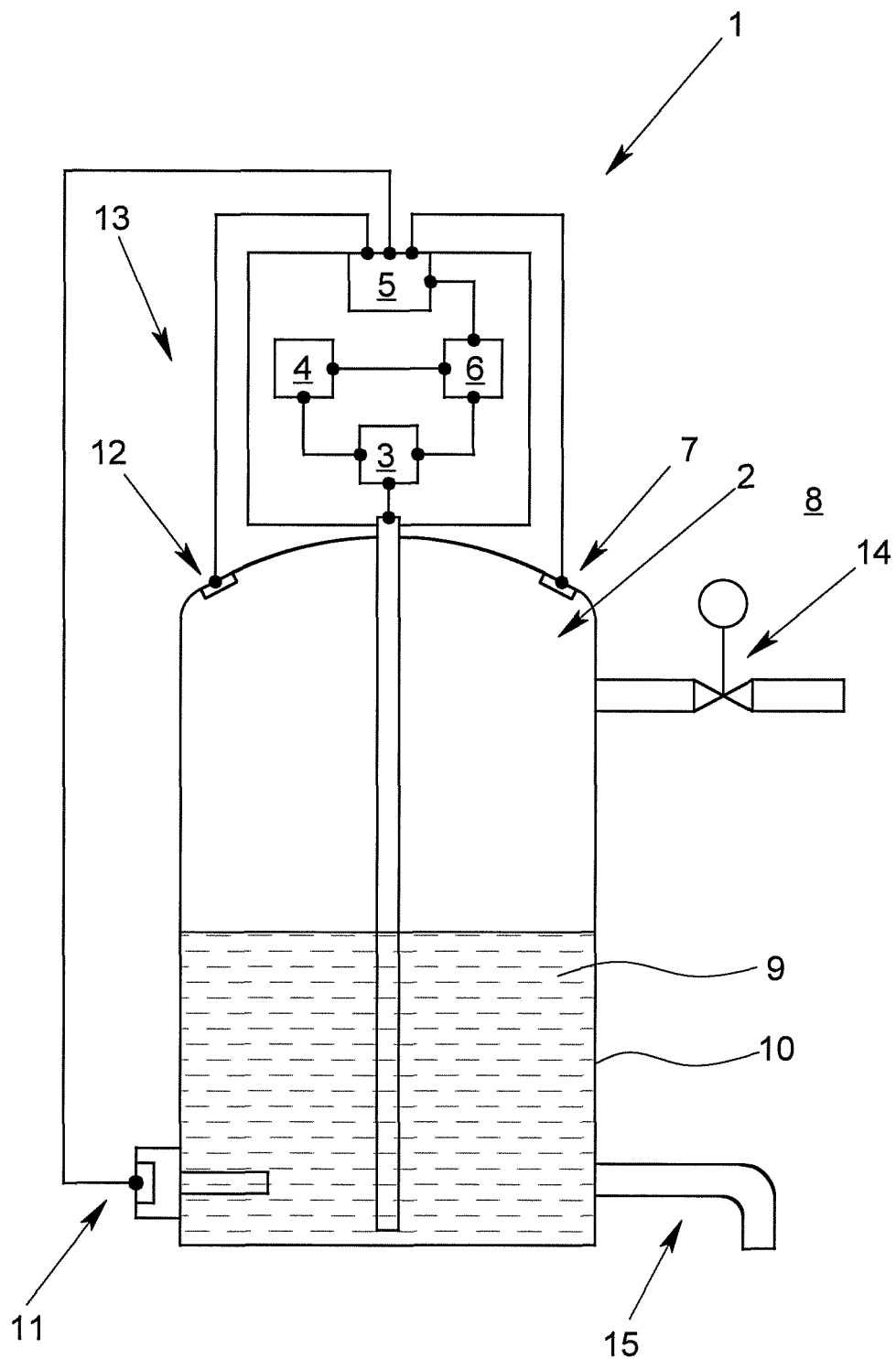

MEASURING DEVICE AND MEASURING ARRANGEMENT

BACKGROUND OF THE INVENTION

Field of the Invention

The invention relates to a measuring device having at least one sensor device, a processing device, a storage device, an interface and a control device, wherein the measuring device generates a measured value for a measured variable, wherein the sensor device generates a primary measured variable associated with the measured variable, wherein the processing device determines the measured value for the measured variable based on calculation data from the primary measured variable stored in the storage device and wherein the control device controls data traffic via the interface. Furthermore, the invention relates to a measuring arrangement having at least one measuring device for generating a measured value for a first measured variable and having at least one secondary measuring device for generating a measured value for a second measured variable.

Description of Related Art

Measuring devices are used in modern process technology to monitor or, respectively to regulate or control processes. In particular, in the case of critical applications, it is necessary, in respect to the reliability of individual measuring devices, that they are checked or that at least an adaptation to the aging processes takes place by means of a possibly necessary recalibration.

Such a test of the measuring device, or ideally, of all components of the device in respect to correct functionality is performed, in particular, regularly or in a fixed time pattern. The monitoring can also be performed by a mechanism present in the measuring device itself. In this manner, it is known in measuring devices, for example, to read back the issued current signal and compare it to a set point. Internal pulse frequencies or voltages are also monitored. In a broad sense, this belongs to the area of diagnostics, wherein, normally, the actual measuring process is not interrupted and the method proceeds automatically.

Furthermore, so-called proof tests are known that are usually triggered manually or with time control. For this, the measuring operation is normally interrupted for the duration of the tests or the measuring devices are even dismounted from their respective measuring sites. The dismounting allows, for example, a subsequent testing of the measuring device under the well-defined conditions of a laboratory or the examination of individual components, for which dismounting of the measuring device is necessary.

A great difference between a diagnosis of the functionality and a proof test is, thus, that the diagnosis takes place automatically, and normally, without interruption of the actual measuring operation, while the proof test takes place manually, or in particular, in the off-line mode of the measuring device.

Normally, measuring devices are not provided alone in a process, but form a measuring arrangement with other units, devices or apparatuses, which is established in an appropriate process environment. Such measuring arrangements can provide the advantage that individual measuring devices complement one another in the sense of redundancy or diversity.

A measuring device for measuring at least one measured variable or for generating a measured value thereby normally has at least one sensor device, a processing device, a storage device, an interface and a control device.

The measured variable is, for example, fill level, flow, mass flow, pressure, viscosity, pH value, temperature or conductivity. The sensor device generates a primary measured variable in conjunction with the measured variable, which is processed by the processing device. In particular, the processing device generates the measured value based on calculation data from the primary measured variable that is stored in the storage device.

Controlling the measurements is carried out by the control device. The control device also controls, in particular, the data traffic via the interface, i.e., issuing the measured value or retrieving and inputting further external data.

The measuring device is thereby described in respect to the functional distribution of the individual components. However, this does not have to take place in the specific implementation, rather it is possible that, for example, the processing device and the control device are included in one unit, wherein the storage device is optionally also directly installed.

In the broad sense, a measuring arrangement is understood to be a combination of at least two measuring devices. Thereby, this is a measuring device for generating a measured value for a first measured variable. This measuring device is, for example, the above-described measuring device, wherein the measured variable, which the measuring device is to measure, is the first measured variable here. Furthermore, at least one secondary measuring device is provided for generating a measured value for a second measured variable. The measuring device for the first measured variable could, thus, also be called a primary measuring device.

SUMMARY OF THE INVENTION

The object of the invention is to provide a measuring device and a measuring arrangement that allows a simplified testing of the functionality of the measuring device or, respectively, a measuring device as part of a measuring arrangement.

The measuring device according to the invention, in which the above derived and described object is achieved, is initially and essentially wherein the control device—in particular autonomously, i.e. without an external command or by means of manual actuation—retrieves externally provided data via the interface. In this quasi first step, the control device makes in inquiry about data that is located outside the measuring device and that is provided to the measuring device. For this, in particular, the measuring device is connected to other measuring devices or data storage units, etc. via the interface for data communication. Furthermore, data communication is preferably bidirectional, so that the control device can send a query and then receive the data. If the control device has received the externally provided data, then a testing of the measuring device is carried out with this data in a subsequent step.

Testing can thereby be comprised of one of two variations:

In the first variation, which takes place in the scope of a proof test in one design, the test comprises the control device determining a reference value from the externally provided data. The reference value for the measured variable is then compared to a measured value generated by the processing device—i.e., to a measured value of the measuring device for the measuring variable—in order to generate a comparison result from it.

In this design, thus, an external value for the measured variable is compared to an internal value. The comparison value describes whether the reference value and the measured or determined value of the measuring device for the measured variable differ from one another or whether they are the same—at least within a given threshold or tolerance range.

In the second variation, which can take place, in particular, in the scope of a recalibration of the measuring device, the test provides that the control device uses the externally provided data for the generation of new calculation data to be stored in the storage device and stores the new calculation data in the storage device. Here, thus, the externally provided data and the measured data or measured values of the measuring device are directly linked to one another. In particular, the externally provided data is used to map the measured values of the measuring device on the actually-existing measurement state.

In one design, a proof test thereby follows such a recalibration insofar as the comparison result signifies a deviation between the reference value and the measured value measured by the measuring device. Thus, it is identified that the measured values are no longer optimal and then adaptation is carried out. In one design, a repeated, significant change of the calibration values is classified as an indication of aging or of a defect. Additionally or alternatively, in one design, deviations of the calibration values beyond a certain maximum threshold value are classified as an indication of a device error.

In one design, the measured variable is the fill level of a medium in a container. In an associated design, the measuring device allows for continuous measurement of the fill level. The externally provided data, which are externally provided measured values in this case, is retrieved by a limit level switch. The measuring device is thus connected to a limit level switch—at least temporarily—and the control device retrieves the signals of the limit level switch as externally provided data, which indicates whether a limit level has been reached or not.

The above measuring device represents a significant simplification of the proof test. In particular, a redundant acquisition of data and measured values can thus be taken advantage of. A dismounting of the device to be tested can, especially, be avoided.

The externally provided data thereby originates, for example, from redundant sensors, i.e., other measuring devices, which are also used for determining the relevant measured variable. This can thereby be identical measuring devices or different measuring devices, e.g., using different measuring principles. Furthermore, different measuring devices can also be combined with one another. In this manner, flowmeters are often also temperature sensors. If such a measuring device is connected to a separate temperature sensor, then this allows for the testing of the temperature sensor that belongs to the measuring device.

Furthermore, the object is achieved according to the invention by the measuring arrangement, which is initially and essentially wherein the measuring device receives a measured value generated by the secondary measuring device for the second measured variable and uses it for testing the measuring device.

In the measuring arrangement according to the invention, the measuring device, which can be called primary measuring device in this context, receives a measured value from the secondary measuring device and uses it for self-testing. The testing can, thereby—as described above in terms of the measuring device—comprise, in the sense of a proof test, the measured value generated by the measuring device for the first measured variable being compared, namely, either directly to the measured value for the second measured variable—provided that the first and the second measured variable are identical—or to a measured value for the first measured variable determined from the measured value for the second measured variable. Alternatively, the measured value of the second measured variable can also be used for recalibration of the measuring device.

It is thus provided, in one design, that the first measured variable and the second measured variable are identical. Thus, redundancy prevails in view of the measured variable.

In this context, the first and the second measured variable should also be understood such that it is not necessarily the measured variable for which the respective measuring device was actually designed. In the above-mentioned flowmeter, for example, the flow is the actual, relevant measured variable. However, if a temperature sensor is provided, then the temperature can also be understood as the first measured variable of this measuring device.

In one design, the measuring device is used to generate continuous measured values, whereas the secondary measuring device is designed as a limit level switch. In a further design, additional measuring devices are further provided. In one variation, several limit level switches are also provided.

The possibility that a measuring device determines and suitably combines different measured variables is implemented in the following design.

The measuring device, thereby, has a sensor device as well as a secondary sensor device. The sensor device—which is thus also called primary sensor device—is thereby used for generating a primary measured variable associated with the first measured variable. The secondary sensor device allows for the generation of a measured value for the second measured variable. The second measured variable is, for example, the temperature, wherein the first measured variable is, e.g., the flow, the fill level, or the pH value.

In a further design, the measuring device and the secondary measuring device are arranged in a process environment. This, for example, is a processing system, in which a medium to be monitored is found. For the testing of the measuring device, the measuring device accesses data via the process environment. The externally provided data can thus also be of complex nature or it can be a plurality of individual pieces of data, which are to be accordingly stored in the measuring device.

The above designs of the measuring device accordingly also hold true for the measuring arrangement or the descriptions and explanations in respect to the measuring arrangement can also be applied to the measuring device according to the invention, which, in particular, is a part of the measuring arrangement.

In one design, the measuring device and the secondary measuring device are tightly linked to one another and are, thus, informed about one another or of the respective measured values.

In an alternative design, the measuring device and the secondary measuring device are connected to one another for the specific purpose of performing the test, wherein the trigger for retrieving data can optionally take place using an external trigger signal.

In detail there is a plurality of possibilities to design and further develop the invention as will become apparent from the following description of an embodiment in conjunction with the drawings.

BRIEF DESCRIPTION OF THE DRAWING

The sole FIGURE is a schematic representation of a processing system utilizing the measuring device of the present invention.

DETAILED DESCRIPTION OF THE INVENTION

In the FIGURE, the use of a measuring device 1 for continuous fill level measurement is schematically shown. The measuring device 1 has a sensor device 2 for this, which, here, consists of a rod-shaped waveguide for guiding electromagnetic signals. The fill level is determined from the transit time of the signals—as is known from the prior art. The determination of the measured value for the fill level as exemplary measured variable is performed by the processing device 3. In order to determine the measured value, the processing device 3 accesses a storage device 4, in which respective calibration data, algorithms or value tables are stored. An interface 5 is provided for issuing the determined measured value or for receiving data, wherein data flow takes place via the control device 6 here, which also accesses the processing device 3.

The sensor device 2 generates a primary measured variable, which is used for determining the measured value for the actual measured variable—fill level.

The measuring device 1 additionally has a secondary sensor device 7, which is designed here as a temperature sensor and whose measured values are used in the determination of the measured values for the measured variable fill level.

The measuring device 1 is located as a whole in a process environment 8 and is thereby used for determining the fill level of the medium 9, which is a liquid, here, as an example, in a container 10.

In addition to the measuring device 1 used for continuous measurement, a secondary measuring device in the form of a limit level switch 11 is provided near the floor of the container 1. This secondary measuring device 11 thus indicates whether the fill level associated with the design of the measuring device 11 and its mounted position has been achieved. Thus, only binary information is generated. This is, for example, a so-called oscillation fork, whose mechanical oscillations are evaluated.

Overall, the measuring device 1 is used for continuous measurement of a first measured variable and the secondary measuring device 11 is used as limit level switch of the measurement or, especially, for monitoring a second measured variable, wherein the first and the second measured variable are the same, here, the fill level of the medium 9.

Additionally, a further secondary measuring device is also provided in the form of a temperature measuring device 12. This temperature measuring device 12 thus measures the temperature as primary measured variable, wherein the temperature for the measuring device 1 is a secondary measured variable in relation to the primary measured variable, fill level.

Furthermore, the measuring device 1 and the two secondary measuring devices 11, 12 in the shown design form a measuring arrangement 13 in the process environment 8.

In order to change the fill level of the medium 9, an inflow 14 with valve or an outflow are provided.

Via the interface 5, the control device 6 is connected to the secondary measuring device in the form of the limit level switch 11 and to the secondary measuring device in the form of the temperature measuring device 12. Additionally, as an example, the connection to the secondary sensor device 7 is implemented via the interface 5.

The control device 6 retrieves externally generated or provided data and, here, special measured data via the interface; external being hereby relative to the measuring device 1.

The control device 6 thus receives information from the limit level switch 11 whether the fill level that is associated with the mounting position of the limit level switch 11 has been reached.

Based on this externally provided measured value, the measuring device 1 performs a test. This can thereby occur as part of a proof test or as part of a recalibration of the measuring device 1:

During the proof test, the measuring device 1 tests itself in view of its reliability. The measuring device 1, or specifically its control device 6, thereby compares the externally provided measured value to an associated measured value generated by the measuring device 1. Thus, in the shown example, it is to be compared that the limit level switch 11 displays coverage by the medium 9 and that the measured value of the measuring device 1 for the fill level is above the fill level associated with the limit level switch 11. Based on this comparison of the measured values, the control device 6 generates a comparison result.

If the comparison result indicates that the two measured values for the fill level are located within a given threshold value, which is also to be understood as tolerance range for a deviation, then the measuring device 1 functions reliably. If the two measured values differ beyond the threshold value, the deviation is greater than the tolerance range and the measuring device 1, in one design, issues a warning signal and, preferably, shuts down its task. In an alternative variation, the measuring device 1 takes the deviation as opportunity for recalibration.

This recalibration is, thereby, in one variation, also the alternative or additional implementation of the test that the measuring device 1 performs with the externally provided measured value.

During recalibration, the assignment of the measured values of the measuring device 1 is made with the externally measured values or with the real, existing values. For this, corresponding compensating data or general calculation data are determined and stored in the storage unit 4 as new data. Data is, thus, generated, via which the measured values of the measuring device 1 again correspond to the externally provided measured values.

Since the measuring device 1 is additionally connected to the temperature sensor 12, the control device 6 can also test its own secondary sensor device 7 and possibly also perform a recalibration for this.

In order to test the measuring device 1, the control unit 6 also accesses the process data of the process environment 8, in a particular variation. Thereby, the control unit 6 also receives data via the interface 5 about the inflow and outflow of medium into or out of the container. The fill level can be calculated using corresponding, stored data about the geometry of the container and about the characteristics of the medium and can be compared to the measured value determined via the sensor device 2.

In a further—not shown—variation, data about the process environment 8 deals with several flowmeters obtaining the flow of the same medium. Depending on the arrangement of the individual measuring devices, the measured values can then be accordingly compensated by one another. If, for example, a measuring device is assigned an inflow that separates into two, separate flows and if each of the flows is assigned a measuring device, then the sum of the measured values of both measuring devices equals the measured value of the measuring device of the inflow.

What is claimed is:

1. Measuring device, comprising:
at least one sensor device,
a processing device,
a storage device,
an interface, and
a control device,
wherein the at least one sensor device comprises a primary sensor device for generating a primary measured variable associated with a first measured variable, and a secondary sensor device for the generation of a second measured value for a second measured variable,
wherein the processing device is operative for determining the first measured value for the measured variable from the primary measured variable based on calculation data stored in the storage device,
wherein the control device is operative for controlling data traffic via the interface,
wherein the control device is operative for retrieving externally provided data from the secondary sensor device via the interface and
wherein the control device is operative for performing a test of the measuring device based on the externally provided data from the secondary sensor device that comprises the control device determining a reference value from the externally provided data, comparing the reference value to a measured value generated by the processing device from the primary measured variable and generating a comparison result based thereupon, the control device indicating that the measuring device is functioning reliably if the comparison result is within a given threshold deviation value, and if the comparison result exceeds the given threshold deviation value, the control device performing a recalibration using the externally measured values for determining corresponding compensating data or general calculation data that is stored as new data for use in subsequent testing of the measuring device.

2. Measuring device according to claim 1, wherein the control device is operative for performing the test in the scope of a proof test so that it generates the comparison result.

3. Measuring device according to claim 1, wherein the first measured variable is the fill level of a medium in a container and wherein the control device is operative for retrieving the externally provided data from a limit level switch as said second measured value.

4. Method of testing a measuring device having a primary sensor device and a secondary sensor device, a processing device, a storage device, an interface, and a control device, comprising the steps of:
operating the measuring device,
generating a primary measured variable associated with a first measured value with the primary sensor device, and generating a second measured value for a second measured variable with the secondary sensor device,
determining the measured value for the first measured variable from the primary measured variable based on calculation data stored in the storage device with the processing device,
controlling data traffic via the interface with the control device,
retrieving data provided externally from the secondary sensor device via the interface with the control device, and
performing a test of the measuring device by the control device either determining a reference value from the data provided externally from the secondary sensor device via the interface, comparing the reference value to a measured value generated by the processing device generating a comparison result based thereupon and either indicates that the measuring device is functioning reliably if the comparison result is within a given threshold deviation value, or if the comparison result exceeds the given threshold deviation value, either issues a warning signal or performs recalibration using the externally measured values for determining corresponding compensating data or general calculation data and stores the data as new data for use in future testing of the measuring device.

5. Method according to claim 4, wherein the control device performs the test as a proof test that generates the comparison result.

6. Method according to claim 4, wherein the measured variable is the fill level of a medium in a container and wherein the control device retrieves the externally provided data from a limit level switch.

* * * * *